United States Patent [19]

Lippman et al.

[11] Patent Number: 5,003,377
[45] Date of Patent: Mar. 26, 1991

[54] EXTENDED DEFINITION TELEVISION SYSTEMS

[75] Inventors: Andrew B. Lippman, Salem; Edward H. Adelson, Cambridge, both of Mass.; William J. Butera, Arlington, Va.

[73] Assignee: Massachusetts Institute of Technology, Cambridge, Mass.

[21] Appl. No.: 296,511

[22] Filed: Jan. 12, 1989

[51] Int. Cl.⁵ ............................................. H04N 11/14
[52] U.S. Cl. ....................................... 358/12; 358/16; 358/142
[58] Field of Search ...................... 358/12, 14, 15, 16, 358/141, 142

[56] References Cited

U.S. PATENT DOCUMENTS

| | | | |
|---|---|---|---|
| 4,268,861 | 5/1981 | Schreiber | 358/138 |
| 4,287,528 | 9/1981 | Levy | 358/142 |
| 4,429,327 | 1/1984 | Oakley | 358/12 |
| 4,517,597 | 5/1985 | Glenn | 358/141 |
| 4,701,783 | 10/1987 | Glenn | 358/12 |
| 4,733,299 | 3/1988 | Glenn | 358/11 |
| 4,794,447 | 12/1988 | Tsinberg | 358/12 |

OTHER PUBLICATIONS

Single-Channel Backward-Compatible EDTV Systems, Lippman et al., SMPTE Journal, Jan. 1989, pp. 14–19.

Glenn et al., "Reduced Bandwidth Requirements for Compatible High Definition Television Transmission", from the Proceedings of the ICG-HDTV Conference in New Orleans, Apr. 1984.

Glenn et al., "Compatible Transmission of High Definition Television Using Bandwidth Reduction", from the Proceedings of the IGC-HDTV Conference in New Orleans, Apr. 1984.

Primary Examiner—Tommy P. Chin
Attorney, Agent, or Firm—Thomas J. Engellenner

[57] ABSTRACT

Methods and systems for adding additional information to broadcast motion picture signals so that an advanced receiver can decode that information to provide improved picture quality, while a standard receiver will display an image with minimally visible impairments. In particular, chrominance information can be generated at a fraction of the frame rate and the alternate frames then used to encode additional data, such as high definition luminance information in the chrominance signal.

13 Claims, 2 Drawing Sheets

CHROMINANCE SIGNAL FROM
A SINGLE PIXEL ON SUCCESSIVE
FRAMES.

CHROMINANCE SIGNAL
AVERAGE OVER PAIRS OF
FRAMES.

ENHANCEMENT SIGNAL TO
BE ADDED TO ABOVE
SIGNAL.

FINAL CHROMINANCE
SIGNAL WITH COMBINED
ENHANCEMENT DATA.

EXTENDED DEFINITION TELEVISION SYSTEMS

BACKGROUND OF THE INVENTION

The technical field of this invention is signal processing and, in particular, the addition of information to broadcast motion picture or television signals.

Conventionally, television broadcast signals in the United States are transmitted in accordance with the National Television Systems Committee (NTSC) standards. The NTSC code provides a format whereby motion pictures (i.e. sequences of still frames) can be broadcast and reconstructed in a receiver for display in rapid succession to the viewer. There is considerable interest in adding additional information to broadcast signals in manner that would be compatible with the NTSC format and yet permit an advanced receiver to decode the additional information.

A goal of such "extended definition television" (EDTV) systems is the production of a broadcast signal that can be received with negligible loss of quality on existing home equipment but when received on an advanced receiver can produce a picture with improved resolution, aspect ratio, or sound.

However, it is difficult to find channel space within the NTSC signal format for additional data with which to enhance the image quality and sound without at the same time causing deterioration of performance of standard receivers.

Various proposals for EDTV systems have been made including, for example, use of blank regions of the spectrum, higher order interlace, time compression at the edges, and altered modulation techniques. Unfortunately, these systems typically result in visible degradation of the image.

Other proposals include the addition of new subcarriers, which would require substantial modification of the present NTSC format, or the use of a second transmission channel to transmit the additional information.

There exists a need for an extended definition television system which could add information to standard NTSC signals to provide enhanced viewing for a receiver attuned to decode such additional information while also permitting viewing with a standard receiver with minimal visual disturbances. Such an extended definition system would satisfy a long-felt need in the art.

SUMMARY OF THE INVENTION

Methods and systems for adding additional information to broadcast motion picture signals are disclosed so that an advanced receiver can decode that information to provide improved picture quality, while a standard receiver will display an image with minimally visible impairments. In particular, the present invention discloses that chrominance information can be generated at a fraction of the frame rate and the alternate frames then used to encode additional data, such as high definition luminance information in the chrominance signal.

In one illustrated technique, data are hidden in the high temporal frequencies of the chrominance signal. The chrominance frame rate is lowered and the additional channel space thus provided is used to carry augmentation data. The lower temporal response of the human visual system to chrominance information allows one to add information invisibly. This additional data causes no problems on normal receivers and is thus available over the entire image area. In fact, it can be used independently of any other image enhancement system to add data to the signal for any purpose, including captioning, graphics, enhanced resolution, or program identification.

The invention will next be described in connection with certain illustrated embodiments; however, it should be clear that various additions, subtractions and modifications can be made without departing from the spirit or scope of the invention. For example, instead of adding high resolution luminance information to the chrominance signal, the present invention can also be used to increase vertical and/or horizontal resolution, to widen the picture, or to reduce spatio-temporal aliasing by supplementing the interlaced transmission with a second signal that produces a true, progressively scanned display.

Additionally, it should also be clear that although the present invention is illustrated in connection with a system which transmits chrominance information at one half the frame rate, other interleaving approaches such as transmitting averaged chrominance valves at one third the frame rate or less may be advantageous in particular applications.

DETAILED DESCRIPTION

There is at least one way in which the NTSC signal contains more information than is necessary for satisfactory video display. The human visual system has low sensitivity for high temporal frequency chrominance noise. In this regard, NTSC is over-designed. Not only is the frame rate for the chrominance signal higher than is visually necessary, but noise at the frame rate is not noticeable. This suggests that one can lower the frame rate of the NTSC chrominance signals and overlay enhancement information onto them without significant degradation of the received picture on existing receivers. One method for doing so follows. It entails adding low-level data to the chrominance signal modulated on a 15 Hertz carrier.

Figure 1A:
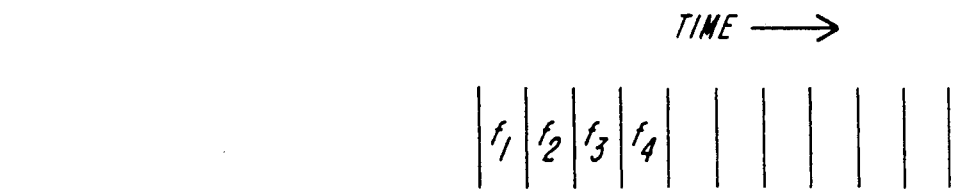
FIGS. 1A-1D are graphic illustrations of data addition to a chrominance signal in accordance with the present invention.
Figure 1A:
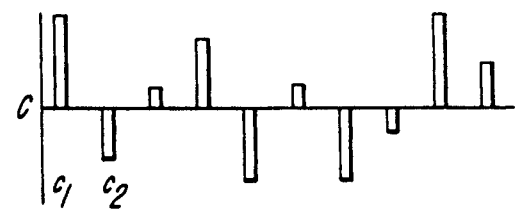

Consider two successive NTSC frames, $f_1$ and $f_2$, with associated color components $c_1$ and $c_2$ for a given picture element (pixel). FIG. 1A illustrates a succession of such color components in a sequence of NTSC frames; c can represent the I or the Q component of the NTSC color signal for each frame; each is treated in the same manner. From these, we create a new chrominance signal at that point:

$$\bar{c} = (c_1 + c_2)/2 \quad (1)$$

which is the average of the two successive chrominance at that point on two successive frames.

Figure 1B:
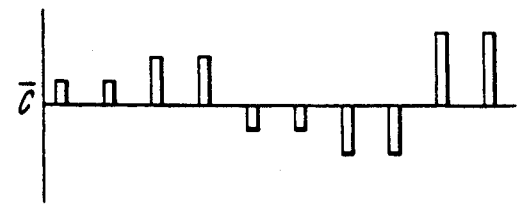

As shown in FIG. 1B, this single frame of synthesized chrominance information will be transmitted during both $f_1$ and $f_2$. The reduced frame rate causes no noticeable degradation of the image on standard receivers.

Figure 1C:
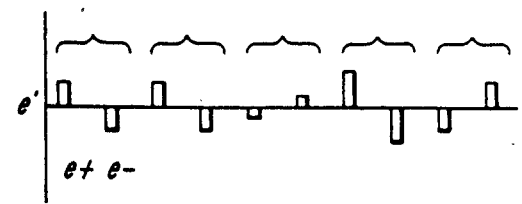
Figure 1D:
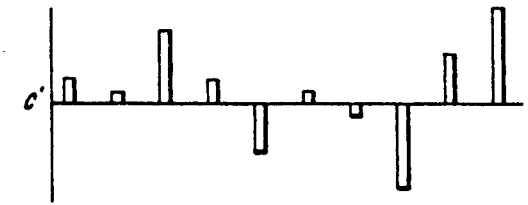

To this synthesized chrominance signal, $\bar{c}$, the low-level augmentation information, e, that will be used on both frames, is alternately added and subtracted. Thus, as shown in FIG. 1C, a new augmentation signal e' is created from the augmentation information e in which the augmentation values are altered in sign over successive frames. Signal e' is added to the average chrominance signal c', as shown in FIG. 1D. As a result, the first frame consists of $\bar{c}+e$ and the second contains $\bar{c}-e$. This has the effect of AM modulating the information onto the 15 Hertz carrier.

On average, the NTSC receiver will display the correct chrominance value. As shown in FIG. 1D, this is an image substantially equal to the original NTSC image but impaired slightly by the addition of color noise (the augmentation information). The carrier ensures that the phase of the added information alternates each frame and thus minimizes its visibility.

The enhancement signal can be directly obtained by filtering the output of a high resolution television camera. Similarly, it is straightforward to separate the high channel into two components, one used to modulate the I chrominance channel and the other the Q. Any of the number of modulation techniques can be used; the essential point is that there is room for additional data equal to the sum of the I and Q bandwidths at one-half the frame rate.

Figure 2:
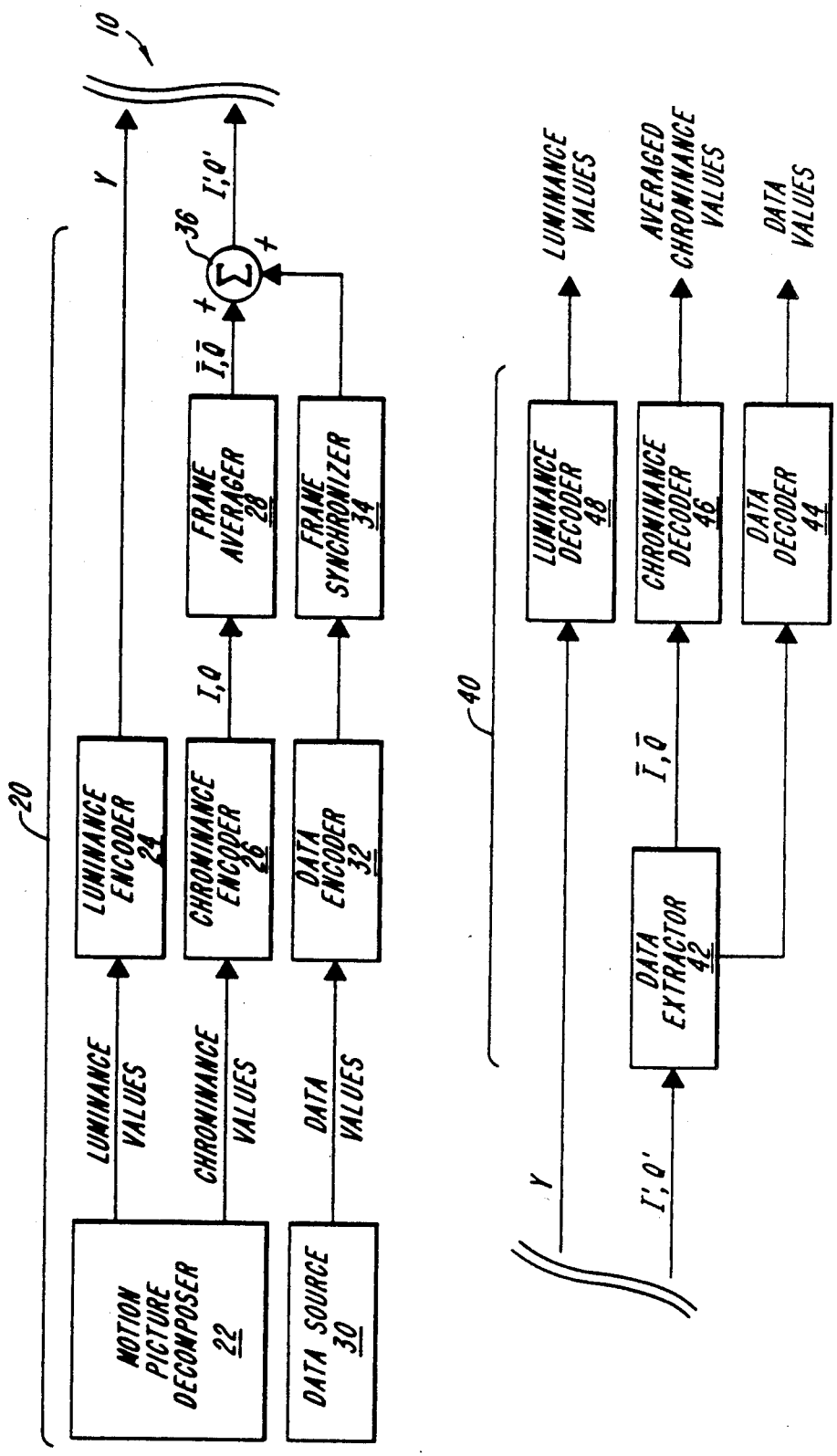
FIG. 2 is a schematic illustration of an extended definition television system in accordance with the present invention.

FIG. 2 is a block diagram of an EDTV system 10 in accordance with the present invention. The broadcast system 20 includes picture decomposer 22 which extracts luminance and chrominance values from a motion picture, as well as luminance encoder 24 and chrominance encoder 26 which encode the luminance values and chrominance values, respectively, in accordance with the standard NTSC format. The chrominance values, I and Q, are then each averaged over two successive frames by frame averager 28. Data values from data source 30 are then encoded (e.g., as amplitude modulations on the 15 Hertz carrier) by data encoder 32 and alternately added and subtracted from the averaged frame values by frame synchronizer 34 and summer 36 to obtain the modified chrominance values, I' and Q'. The data values can be interleaved with the chrominance signals in a variety of ways such as, for example, by the use of quadrature mirror filters.

In the receiver 40, the broadcast chrominance values are first processed by data extractor 42 and the data decoded by data decoder 44. The underlying chrominance signal is then decoded by chrominance decoder 46 in parallel with the decoding of the luminance values by luminance decoder 48 according to the conventional NTSC protocol.

At the receiver, the difference between the chrominance information on two successive frames decodes the enhancement signal: $2e=(\bar{c}+e)-(\bar{c}-e)$. The enhancement signal, like the chrominance signal is transmitted at reduced frame rate and dynamic range.

If one assumes that there are the equivalent of 420 picture elements per horizontal line in an NTSC picture, then there is the equivalent of 120 elements available in the I chrominance signal and 50 in the Q. This provides an additional 170 elements, or a 40% increase in horizontal resolution. This additional resolution is provided at one-half the frame rate.

The temporal and dynamic range limitations placed on the enhancement signal, in general, are not severe. In one embodiment, the enhancement signal can provide the high spatial frequency components of an EDTV luminance signal. It is known in the art that pictures can be separated into multiple spatial frequency bands each of which can be transmitted at different spatial and temporal resolutions. For example, two-channel spatial frequency coding scheme can be implemented where the channels comprised a lows channel that is coarsely sampled and finely quantized and a highs channel that is finely sampled and coarsely quantized. Minimal quality degradation results. This can also be extended into the temporal domain, for example, with a two-channel EDTV system where the high spatial frequencies are transmitted at one-quarter to one-half the NTSC rate.

An additional feature of the enhancement signal is that it can be spatially correlated with the underlying image to which it is applied. When this obtains, it has significant amplitude only in active regions of the picture and is thus masked by it: the chrominance noise is masked by luminance detail.

In fact, the design principles of this system are similar in form to those used in the original specification of the NTSC system: in the NTSC format, the amplitude of the color subcarrier is roughly in proportion to the saturation at each point in the image; in the present invention, the data added to the chrominance signal exists only at sharp edges, and its visibility is masked by the edge, itself. In both systems, where there is no additional data, color in the NTSC case, or detail in our EDTV system, the signal is not degraded by the additional information. Also, like NTSC, the present invention requires a sequence of two frames to completely reconstruct the image—the additional information alternates in phase on successive frames.

An additional improvement to this system can be obtained by reducing the vertical chrominance resolution. The NTSC channel is capable of transmitting far greater vertical color resolution than horizontal, in fact more than is necessary for high quality image display. In general, for a given picture number of picture elements, it is better to distribute them isotropically. In an NTSC signal, halving the vertical chrominance resolution introduces minimal visible degradation. Thus, the same procedure for adding data temporally can be used vertically, increasing the enhancement information rate by an additional 50%.

Moreover, it is reasonable to reduce the chrominance rate even further in still or slowly moving regions of the image. We suggest a factor of two for simplicity of implementation and description, however, lower chrominance rates are reasonable. Luminance highs can be similarly treated, as noted above, effectively trading temporal for spatial resolution in luminance alone.

Finally, the operation of the entire system can be made adaptive. The enhancement information can be adaptively applied to vertical and horizontal picture detail, and the decision about the chrominance rate and vertical resolution can be made on the basis of picture content. Thus, this type of EDTV system can ultimately progress to improve all visually important regions of the picture.

What is claimed is:

1. A method of adding information to a broadcast motion picture signal, the method comprising:
   decomposing sequential frames of said motion picture into luminance and chrominance values;
   generating a chrominance signal from said chrominance values at a fraction of the rate of said motion picture signal frames; and
   modulating the generated chrominance signal to encode additional information.

2. The method of claim 1 wherein the step of decomposing the frames into luminance and chrominance values further includes decomposing the frames into NTSC-compatible broadcast signals.

3. The method of claim 1 wherein the step of generating a chrominance signal further comprises generating the chrominance signal at one-half of the frame rate.

4. The method of claim 3 wherein the step of generating a chrominance signal further comprises generating said chrominance signal based on an averaged chrominance value obtained from two successive frames.

5. The method of claim 1 wherein the step of modulating the generated chrominance signal further includes adding a data value during one frame and subtracting the data value from the chrominance signal during a next frame.

6. The method of claim 1 wherein said additional information encoded in the step of modulating the generated chrominance signal, is high definition luminance information.

7. The method of claim 1 wherein the method further comprises receiving the modulated chrominance signal and extracting the encoded additional information.

8. An extended definition television system for adding information to a broadcast motion picture signal, the system comprising:
   decomposing means for decomposing sequential frames of said motion picture signal into luminance and chrominance values;
   chrominance signal-generating means for generating a chrominance signal at a fraction of the rate of said motion picture signal frames; and
   modulating means for modulating the generated chrominance signal to encode additional information.

9. The system of claim 8 wherein the chrominance signal-generating means further comprises means for generating the chrominance signal at one-half of the frame rate.

10. The system of claim 8 wherein the chrominance signal-generating means, further comprises means for generating said chrominance signal based on an averaged chrominance value obtained from two successive frames.

11. The system of claim 8 wherein the modulating means further includes means for adding a data value during one frame and subtracting the data value from the chrominance signal during a next frame.

12. The system of claim 8 wherein said additional information encoded in the step of modulating the generated chrominance signal, is high definition luminance information.

13. The system of claim 8 wherein the system further comprises a receiver for receiving the modulated chrominance signal and extracting the encoded addition information.

* * * * *